Jan. 12, 1971  G. WATSON  3,555,367
OFF DELAY TIMER AND INTERNALLY GENERATED AUXILIARY DIRECT
CURRENT VOLTAGE SOURCE FOR A CONTROLLED RECTIFIER
ALTERNATING CURRENT SWITCH FOR USE THEREIN
Filed June 7, 1968  2 Sheets-Sheet 1

WITNESSES:
Bernard R. Gregway
James F. Young

INVENTOR
Guido Watson

BY Maury I. Hull
ATTORNEY

United States Patent Office 3,555,367
Patented Jan. 12, 1971

3,555,367
OFF DELAY TIMER AND INTERNALLY GENERATED AUXILIARY DIRECT CURRENT VOLTAGE SOURCE FOR A CONTROLLED RECTIFIER ALTERNATING CURRENT SWITCH FOR USE THEREIN
Guido Watson, Murrysville, Pa., assignor to Westinghouse Electric Corporation, Pittsburgh, Pa., a corporation of Pennsylvania
Filed June 7, 1968, Ser. No. 735,226
Int. Cl. H01h 47/18
U.S. Cl. 317—142
4 Claims

ABSTRACT OF THE DISCLOSURE

In an off delay timer for operation from an alternating current line, a novel form of internally generated D.C. power source is provided. The output switch of the timer is a controlled rectifier whose gate drive current is obtained from a series resistor 45 and breakdown diode 52 combination, connected to the anode of the aforesaid controlled rectifier. A saturating transistor switch is provided as a means to remove the gate drive to the controlled rectifier when required. In addition, with the aid of a storage capacitor 49, and a series diode, a D.C. potential is derived from the said resistor-breakdown diode circuit, and this D.C. potential is used to power the ancillary circuits of the timer.

CROSS REFERENCE TO RELATED APPLICATIONS

This application is related to the following copending patent applications all assigned to the assignee of the instant invention:

Thompson, "Semiconductor Time Delay Circuits," Ser. No. 571,613, filed Aug. 10, 1966, now Pat. No. 3,486,041;

J. D. Watson, "Off Delay Apparatus," Ser. No. 625,762, filed Mar. 24, 1967, now Pat. No. 3,457,433;

Thompson et al., "Transformerless Solid State On Delay Timer," Ser. No. 732,721, filed May 28, 1968;

Gary, "Off Delay Solid State Time Delay Apparatus," Ser. No. 732,720, filed May 28, 1968; and Gary, "On Delay Solid State Time Delay Apparatus," Ser. No. 732,631, filed May 28, 1968.

BACKGROUND OF THE INVENTION

Field of the invention

The invention relates to time delay circuits using solid state components, and more particularly to such a circuit employing a controlled rectifier as the switching element or output switch.

DESCRIPTION OF THE PRIOR ART

Time delay circuits employing solid state components are well known in the art, certain circuits having been described in the GE Transistor Manual, 7th edition, Figs. 12.27 through 12.31. Additionally, prior art circuits may be shown in Pats. 3,045,150; 3,365,586; 3,197,656; 3,047,745; 3,162,772; 3,158,757; 3,267,289; 2,845,548; 3,132,261; 3,099,758; and 3,202,884.

Generally speaking however where a direct current supply voltage is obtained from a controlled rectifier full wave bridge combination no direct current voltage is obtained while the controlled rectifier is conductive.

SUMMARY OF THE INVENTION

My invention relates to a new and novel circuit for obtaining a direct current supply voltage from a controlled rectifier full wave bridge combination and utilizing said voltage in an off delay timer including a plurality of transistor and diode devices for controlling the operation of the controlled rectifier.

DESCRIPTION OF THE PREFERRED EMBODIMENT

Figure 1:
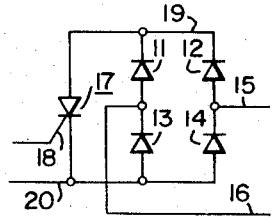
FIG. 1 is a fragmentary view of a controlled rectifier full wave bridge combination of the prior art.

In FIG. 1, diodes 11, 12, 13 and 14 constitute the aforementioned full wave bridge energized from leads 15 and 16, providing a full wave rectified direct current across the controlled rectifier 17 having the control element 18. It is apparent that in this prior art circuit of FIG. 1, while the controlled rectifier 17 is conductive a substantially zero impedance is placed across the output of the full wave rectifier and that no direct current voltage is present on leads 19 and 20.

While the controlled rectifier is conductive however, it completes a circuit for the flow of alternating current between leads 15 and 16 and a relay coil in series therewith as used in an off-delay timer will have current flow therein.

Figure 2:
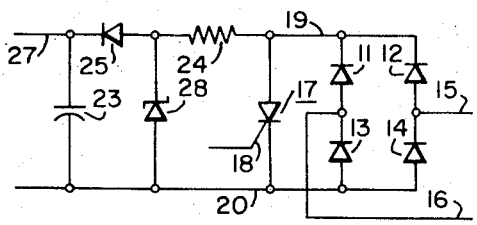
FIG. 2 shows a prior art combination of a controlled rectifier bridge arrangement with a capacitor for obtaining a direct current supply voltage.

In FIG. 2, there has been added to the circuit of FIG. 1 a capacitor 23 to be charged through resistor 24 and diode 25 to supply a direct current voltage between leads 20 and 27. A Zener diode 28 is connected between lead 20 and the junction between resistor 24 and diode 25.

This conventional prior art circuit of FIG. 2 gives a fixed direct current supply voltage provided the controlled rectifier is either non-conductive, or conducts for less than the whole half-cycle. It is seen however that if the controlled rectifier of FIG. 2 is to be used as an alternating current switch, when 100% conduction is required of the controlled rectifier, it does not allow any direct current supply voltage to be produced.

Figure 3:
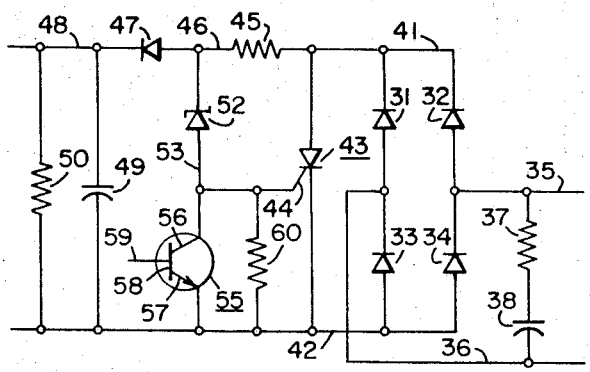
FIG. 3 shows an improved circuit according to my invention in which a transistor is employed to control the conducting time of the controlled rectifier in order to provide a capacitor direct current supply voltage having more desirable characteristics.

The aforementioned disadvantage can be avoided by the circuit of FIG. 3 which I have invented and to which particular reference is made. My circuit of FIG. 3 is a basic controlled rectifier alternating current switch which is still capable of providing a direct current output supply voltage at all times and which employs a transistor to control the controlled rectifier. In FIG. 3 diodes 31 through 34 constitute the full wave rectifier circuit, being energized from alternating current leads 35 and 36 which have connected in series thereacross resistor 37 and capacitor 38. A direct current voltage is provided on leads 41 and 42 which are connected respectively to the anode and cathode of a controlled rectifier generally designated 43 having a control element 44. Lead 41 is connected by way of resistor 45, lead 46, diode 47, and lead 48 to one terminal of a capacitor 49 which is to supply the direct current supply voltage, the other terminal of capacitor 49 being connected to the aforementioned lead 42. A bleeder resistor 50 is shown connected across capacitor 49 which load may be desirable to assist in the explanation of the operation of this circuit portion considered alone, other discharging or load means for a similar capacitor being shown in FIG. 4 hereinafter to be described in detail.

The aforementioned lead 46 is connected by way of Zener diode 52, lead 53 and the collector-emitter path of an n-p-n transistor generally designated 55 to the aforementioned lead 42. It is seen that the transistor generally designated 55 has the collector 56 thereof connected to the aforementioned lead 53, has the emitter 57 thereof directly connected to lead 42 and has a lead 59 connected to the base 58 for bringing a control signal thereto. Lead 53 and the collector 56 are connected to the aforementioned control element 44 of the controlled rectifier generally designated 43, and resistor 60 is seen to be connected between the control element 44 and lead 42.

In the operation of the circuit of FIG. 3, as the anode current through the controlled rectifier 43 falls to zero each half-cycle, the controlled rectifier finds itself without gate drive and switches off. When the anode voltage reappears at the beginning of the next alternation there can be no gate drive until the Zener diode 52 can conduct. This is not possible until the energy lost from the storage capacitor 49 during the previous half-cycle is replenished. When the capacitor 49 is charged sufficiently, the Zener diode 52 is able to conduct and supply the gate and gate-to-cathode resistor 60 with current. The controlled rectifier then fires and its anode voltage disappears. The storage capacitor 49 is disconnected from the rest of the circuit by reverse bias on the series diode 47. Typically the controlled rectifier is nonconducting for some 15 electrical degrees. This represents a loss of some 6% in output current and is quite acceptable in most applications. With a suitable size of storage capacitor 49, the ripple voltage appearing on the direct current output can be made acceptable. Increasing the current drawn from the direct current supply results in an increased firing delay during which time the extra energy taken from the capacitor 49 is replaced through the resistive feed by way of resistor 45 from the anode of the controlled rectifier 43. The controlled rectifier 43 can only fire when this energy is fully replaced, and so the peak direct current output voltage of capacitor 49 stays constant with varying direct current loading.

The aforementioned transistor generally designated 55 is provided so that if desired, or were required, the controlled rectifier 43 can be permanently cut off by having the gate element 44 thereof anchored to the cathode through the saturated transistor 55 this constituting in effect a short circuit switch. Then anode voltage of the controlled rectifier 43 is fed to the Zener diode 52 and is clipped at the breakdown value thereof, and the storage capacitor 49 receives this voltage through the series diode 47. The voltage across the capacitor 49 under these conditions is substantially the same as obtained previously. The regulation of this voltage against loading is essentially that to be expected from a simple Zener diode type regulator.

The aforementioned R-C series circuit of 37-38 connected across the alternating current terminals of the rectifier bridge is added to avoid $dv/dt$ triggering of the controlled rectifier and also serves to insure that the controlled rectifier may fully switch off at the current zero points if the load is highly reactive.

The circuit of FIG. 3 has general applications where auxiliary direct current supply is required to power control circuits coupled to a controlled rectifier, and where conventional means of obtaining such a supply are either too cumbersome or inconvenient. The use of my circuit of FIG. 3 enables a truly two terminal alternating current switch to be constructed.

Further summarizing the circuit of FIG. 3, when transistor 55 is saturated, it effectively shorts the control element 44 of controlled rectifier 43 to the cathode thereof, so that the controlled rectifier does not conduct. When transistor 55 is non-coductive or blocks, the controlled rectifier conducts.

Figure 4:
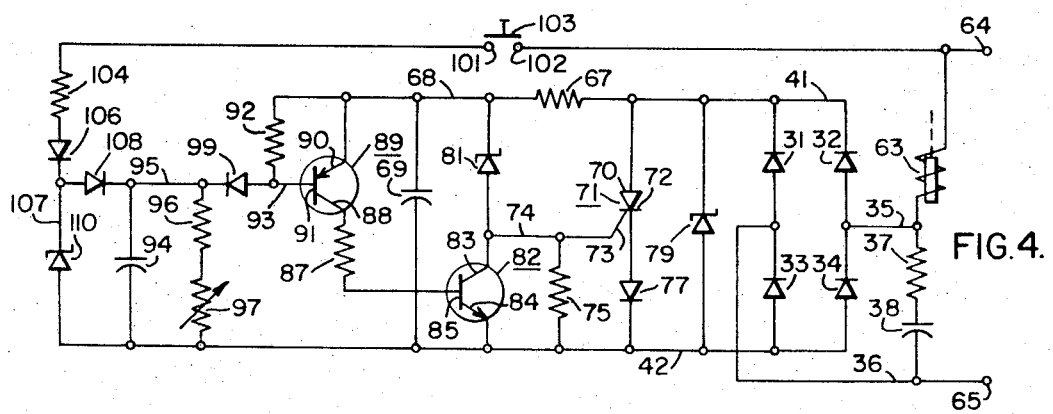
FIG. 4 is an off delay timer according to a preferred embodiment of my invention employing an adaptation of the circuit of FIG. 3.

Particular reference is made now to FIG. 4, a timing circuit of the off delay variety employing the above-described invention of FIG. 3 and other inventive concepts. In FIG. 4 input lead 35 to the full wave rectifier is seen connected by coil winding 63 to terminal 64, and input lead 36 to the rectifier is connected to terminal 65 of the alternating current line. Positive lead 41 is seen to be connected by way of resistor 67 and lead 68 to a capacitor 69 having the other terminal thereof connected to lead 42. Resistor 67 may have a value of 27 kilohms, and capacitor 69 may have a value of 50 nanofarads. Capacitor 69 may be referred to hereinafter in the claims as a storage capacitor. The aforementioned lead 41 is connected to the anode 70 of a controlled rectifier generally designated 71 having a cathode 72 and control element 73. Control element 73 is connected by way of lead 74 and resistor 75 to lead 42. Resistor 75 may have a value of 560 ohms. The aforementioned cathode 72 of controlled rectifier 71 is connected by way of diode 77 to the aforementioned lead 42. Diode 77 may be a type known in the trade as 1N4822. Connected between leads 41 and 42 is a Zener diode 79 which may be a type known in the trade as 1N3051.

As in FIG. 3, there is connected in shunt with the capacitor 69 a series-connected Zener diode and a transistor, these being designated 81 and 82 respectively. Zener diode 81 may be a type known in the trade as 1N970B, and the transistor generally designated 82 may be a type known in the trade as a 2N1F11. The transistor generally designated 82 has a collector 83 connected to lead 74, an emitter 84 directly connected to lead 42, and a base 85 connected by way of resistor 87 to the collector 88 of an additional transistor generally designated 89 having an emitter 90 connected to the aforementioned lead 68 and having a base 91 connected by way of resistor 92 to the aforementioned lead 68. Transistor 89 may be of the type known in the trade as a 2N3F99 and resistor 92 may have a value of 680 kilohms.

The aforementioned R-C timing circuit includes capacitor 94 having one terminal thereof connected to lead 95 and thence by way of series-connected resistors 96 and 97 to the other terminal and to lead 42. Capacitor 94 which may be referred to in the claims as a timing capacitor may have a value of 5 microfarads, resistor 96 may have a value of 22 kilohms, variable resistor 97 may have a total value of 5 megohms, and preferably has a logarithmic characteristic for variations in the setting thereof. Resistors 96 and 97 may be referred to as timing resistors, or may be referred to together as a timing resistor. Capacitor 94 and lead 95 are connected by way of diode 99 to the aforementioned base 91 of transistor 89. Diode 99 may be of a type known in the trade as 1N459A, and may be referred to in the claims as an isolating diode.

When an electrical circuit is completed through the contacts 101 and 102 by armature 103, one terminal of resistor 104 is connected to the aforementioned alternating current terminal 64. Resistor 104 may have a value of 5.6 kilohms. It is connected by way of diode 106, lead 107 and diode 108 to the aforementioned lead 95 and capacitor 94. Diode 106 may be a type known in the trade as 1N4822, whereas the diode 108 may be of a type known in the trade as 1N459A. A Zener diode 110, which may be of the type known in the trade as 1N3044, is connected from lead 107 to lead 42.

FIG. 4 may be thought of as a combination of FIG. 3 with a voltage comparator to produce a voltage sensitive trigger. This interconnection results in a novel form of synchronous positive feedback and as employed in FIG. 4 constitutes an off delay timer. It is noted that the coupling diode 47 of FIG. 3 to the storage capacitor 49 of FIG. 3 has been eliminated in FIG. 4, and also the value of the storage capacitor has been considerably reduced. The collector of the p-n-p transistor comparator 89, feeds the base 85 of the switching transistor 82. The emitter of the comparator transistor is connected to the positive terminal of the Zener diode 81. The base of transistor 89 is driven through a disconnect diode 99 from the aforementioned parallel combination of the capacitor 94 and resistor 96–97 which forms a timing circuit. The timing capacitor 94 is coupled through another disconnect diode 108 to a half-wave rectifier 106 and Zener diode voltage limiter 110. When the half-wave rectifier is connected to the line as by closing the contacts at 101–102, the circuit rapidly charges the timing capacitor to, for example, 100 volts, where it will remain until the rectifier connection to the line is broken at 101–102. The connection to the line is made externally to the circuit and constitutes its command signal.

Figure 5:
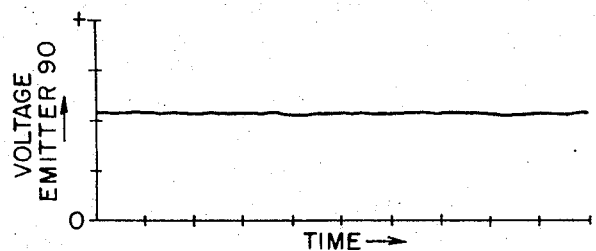
FIGS. 5, 6, 7 and 8 are graphs illustrating the operation of FIGS. 3 and 4.
Figure 6:
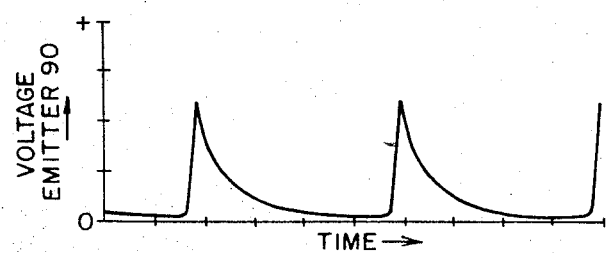

Further by way of operation, initially with no input to the half-wave rectifier 106, a base current flows into transistor 89 through the variable timing resistor 97 and transistor 89 conducts and drives transistor 82 into saturation, and so the controlled rectifier 71 remains permanently off. The feed resistor from the anode of the controlled rectifier, that is resistor 67, drives the emitter of transistor 89 with a voltage determined by the breakdown value of the Zener diode 81. This voltage is held up during the zero crossing points of the controlled rectifier anode waveform by the storage capacitor such that transistor 89 has virtually pure direct current applied to its emitter and conducts continuously. Such a condition is illustrated by the curve of FIG. 5 which shows the emitter voltage on emitter 90 of transistor 89 for the controlled rectifier 71 permanently non-conducting. Should the saturation voltage of transistor 82 increase, the resultant increase of voltage at the emitter 90 of transistor 89 produces a greater current flow in transistor 89 which appears as extra base drive to the saturated transistor 82 and will oppose the original voltage increase. When an input is applied to the half-wave rectifier 106, the rise of voltage on the timing capacitor 94 cuts off transistor 89 and hence cuts off transistor 82 and allows the controlled rectifier to periodically conduct. Conduction of the controlled rectifier is delayed after each zero crossing which turns it off, by the necessity of charging the storage capacitor 69 through the anode feed resistor 67. The R-C time constant is such that the conduction of the controlled rectifier is delayed by some 15 electrical degrees. When the voltage across the storage capacitor 69 equals the Zener diode breakdown voltage of Zener diode 81 current is able to pass into the gate 73 of the controlled rectifier and the gate-to-cathode resistor 75 and the controlled rectifier then fires or becomes conductive. The disappearance of anode voltage on the controlled rectifier results in the storage capacitor being exponentially discharged as shown by the curve of FIG. 6 to which reference is made. FIG. 6 shows the voltage on emitter 90 of transistor 89 for periodic conductivity of the controlled rectifier 71.

Figure 7:
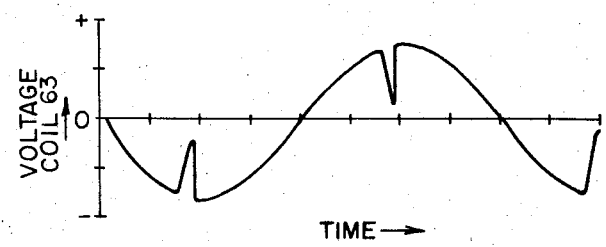
Figure 8:
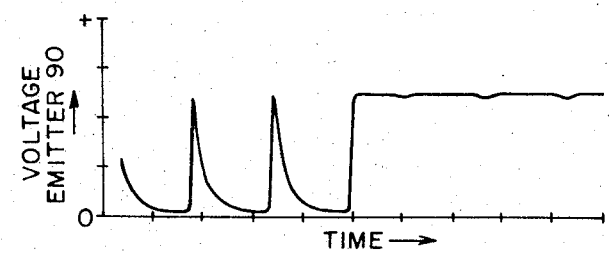

If the input to the half-wave rectifier 106 is removed as by opening the circuit at 101–102 the timing capacitor 94 is now able to discharge exponentially toward zero. During this time the emitter of transistor 89 is driven by the aforementioned waveform of FIG. 6. This waveform has no effect on transistor 89 while the timing capacitor's voltage is higher than the peak voltage of the waveform. As soon as this is no longer the case transistor 89 will begin to conduct on the peaks of the emitter waveform. These bursts of current will produce current flow in transistor 82 each time they occur. When the peak conduction in transistor 82 becomes a noticeable percentage of the normal Zener conduction current of Zener diode 81, a mechanism for positive feedback is set up. Any increase of Zener current increases the Zener voltage during the peaks of current and this results in the waveform on the emitter 90 of transistor 89 having an increased peak value. Such an increase is able to produce a vast increase in the value of peak current in transistor 89. This results in the circuit triggering into the on-state synchronously with one half-cycle of the supply waveform. The controlled rectifier is inhibited from firing by this trigger action and the direct current voltage which then appears on the emitter 90 of transistor 89 as previously described insures continued conduction in both the transistors 89 and 82 and hence the complete cessation of conduction in the controlled rectifier 71. The synchronous trigger action is shown in FIG. 8 to which particular reference is made. In FIG. 7 there is shown the voltage waveform applied to the relay coil 63. The sections removed from the input sine wave by the circuit result in a small loss of coil current of the order of 6% which is of no consequence in the satisfactory operation of the circuit.

Further summarizing the circuit of FIG. 3 for deriving an auxiliary direct current supply and its use in the circuit of FIG. 4 with other components as a synchronous trigger in an off-delay timer circuit, there is provided a circuit of improved operation and a low cost off-delay timer circuit. The circuit of FIG. 4 enables a truly two terminal solid state alternating current switch to be made without having any external means necessary to energize its control circuitry. The cost of this circuit is further reduced since neither a transformer nor a large filter capacitor are needed. The full-wave method of deriving a direct current supply as employed in these circuits requires less filtering than previous half-wave methods and the off-delay timer is a simple, low cost circuit.

Further summarizing the circuit of FIG. 4, assume the circuit is in an idle state with all capacitors discharged. Assume the circuit at contacts 101–102 is open. When terminals 64 and 65 are connected to the alternating current line, current flows from the output of the full-wave rectifier through lead 41, resistor 67, lead 68, resistor 92, diode 99, resistors 96 and 97, the current path being completed by way of lead 42. The voltage at lead 93, which is also the voltage on base 91 is, neglecting the drop in diode 99, substantially that across the timing resistors 96–97. Timing capacitor 94 may be charged to the voltage drop across 96–97, but the charge on the capacitor is far below that value which affects circuit operation. Base current flows into transistor 89 through the aforementioned timing resistors 96–97. The conduction of transistor 89 drives transistor 82 into saturation, and this cuts off the controlled rectifier permanently, as long as terminals 64 and 65 are connected to the alternating current line and 101–102 are open. No current flows in relay coil 63.

Assume now that armature 103 moves to a position where the electrical circuit between 101–102 is closed. A path for half-wave rectified alternating current is established through resistor 104, diode 106, and diode 108, to charge capacitor 94 to a voltage regulated by breakdown diode 110. Within a few alternations, capacitor 94 is charged to, for example, 100 volts, transistor 89 is cut off, and transistor 82 is cut off; a gate drive signal is generated on lead 74 through Zener diode 81 and resistor 67, and controlled rectifier 71 conducts. Although there is a dip in each alternation of the waveform as shown by the curve of FIG. 7, as previously stated, the relay coil 63 is quickly energized.

Assume now that armature 103 moves to a position which opens the circuit at 101–102. The timing capacitor 94 begins to discharge exponentially toward zero, in a manner previously explained. Ultimately the voltage across the capacitor 94 falls to a value whereat diode 99 is forward biased, base current flows in transistor 89 which is conductive, transistor 82 is rendered conductive and controlled rectifier 71 is rendered non-conductive. Current ceases in relay coil 63.

The aforementioned dip in each alternation of the curve of FIG. 7, which is the output of the controlled rectifier 71 while conductive, results from the fact that when the half-wave rectified current drops to zero intermediate each half-cycle, there is no immediate mechanism to make the controlled rectifier conduct again so that momentarily it does not deliver any output.

When the current through the controlled rectifier tries to rise again, because there is an inductive load (coil 63)

current and voltage are substantially 90 degrees out of phase; since the current through the controlled rectifier is zero, at this moment the controlled rectifier "sees" the full line voltage, and the voltage across the controlled rectifier tends to rise instantly to the full line voltage. This voltage makes current flow through resistor 67 which in turn charges capacitor 69. When the voltage on capacitor 69 reaches breakdown voltage of Zener diode 81, base drive is available to controlled rectifier 71 and makes the latter conduct. Conduction in controlled rectifier 71 effectively connects resistor 67 across capacitor 69 for the rest of the half-cycle. Capacitor 69 is therefore caused to discharge exponentially toward zero volts as shown in FIG. 6. The voltage waveform indicated in FIG. 7 is the resultant of the slightly retarded conduction point of controlled rectifier 71 each half-cycle.

Whereas certain diodes, 52, 110, 81 have been referred to as Zener diodes, it will be understood that the voltage applied thereto may in some instances so far exceed the Zener voltage that the diodes become breakdown diodes in which the avalanche effect is predominant.

In some applications of the circuit diode 77 may be omitted if desired.

The foregoing written description and the afore-described drawings are illustrative and exemplary only and are not being interpreted in a limiting sense.

I claim as my invention:

1. Off delay timing apparatus comprising, in combination, a full-wave rectifier adapted to have one input terminal thereof connected to one side of an alternating current line, a relay coil, the other input terminal of the full-wave rectifier being adapted to be connected by way of the relay coil to the other side of the alternating current line, lead means including a normally open switch connected to said last-named side of the alternating current line, a controlled rectifier having the anode-cathode path thereof connected across the output terminals of the full-wave rectifier, said full-wave rectifier while conductive permitting the flow of alternating current through the relay coil, a circuit paralleling the anode-cathode path of the controlled rectifier including in series a resistor, a Zener diode and the collector-emitter path of a transistor, the junction of the Zener diode and the collector of the transistor being connected to the controlled element of the controlled rectifier, circuit means including a storage capacitor connecting the junction between the resistor and the Zener diode to one output lead of the full-wave rectifier, a timing capacitor, a timing resistor connected in parallel with the timing capacitor, an additional transistor, an isolating diode connecting the base of the additional transistor to the circuit junction between the timing capacitor and timing resistor, a second resistor connecting the circuit junction between the last-named base and the isolating diode to one terminal of the storage capacitor and to one terminal of the Zener diode, said isolating diode having applied thereacross the voltage drop across the timing resistor, said voltage drop being provided by current flowing through the second resistor from the full-wave rectifier while the controlled rectifier is non-conductive, the voltage on the base of the additional transistor causing said additional transistor to conduct while the voltage has a predetermined value, means connecting the additional transistor to the base of the first-named transistor and causing said first-named transistor to conduct while the additional transistor conducts thereby rendering said controlled rectifier non-conductive and causing current to cease to flow through the relay coil, further resistor means and further diode means operatively connecting the timing capacitor through said switch to said alternating current line whereby the timing capacitor is quickly charged to a predetermined potential at the instant when the normally open switch is closed at substantially which instant the additional transistor is rendered non-conductive and the first-named transistor controlling the controlled rectifier as rendered non-conductive whereupon the controlled rectifier fires and current flows through the relay coil, said current through the relay coil continuing while the controlled rectifier is on and the switch is closed, the opening of the switch thereafter permitting the timing capacitor to slowly discharge through the timing resistor for a predetermined time period until the voltage supplied to the additional transistor falls to a value at which said additional transistor becomes conductive thereby rendering the first-named transistor conductive thereby rendering the controlled rectifier non-conductive and causing current to cease to flow through the relay coil.

2. Apparatus according to claim 1 including in addition other Zener diode means for regulating the charging voltage across the timing capacitor.

3. Apparatus according to claim 2 including an additional Zener diode connected across the output terminals of the full-wave rectifier to avoid the application of transient peak voltages across the controlled rectifier.

4. Apparatus according to claim 2 including in addition a resistor and a capacitor connected in series between one side of the alternating current line and that terminal of the relay coil connected to an input lead of the full-wave rectifier to prevent transients from affecting the current in the relay coil.

References Cited

UNITED STATES PATENTS

| 3,333,175 | 7/1967 | Klyce | 318—487 |
| 3,243,796 | 3/1966 | Harmon et al. | 340—253 |
| 3,249,812 | 5/1966 | Price | 317—12 |
| 3,425,050 | 1/1969 | Tellerman | 340—256 |
| 3,201,597 | 8/1965 | Balan | 307—252 |
| 3,146,392 | 8/1964 | Sylvan | 323—22 |
| 3,266,167 | 8/1966 | Finnegan | 34—45 |

J D MILLER, Primary Examiner

C. L. YATES, Assistant Examiner

U.S. Cl. X.R.

317—153